United States Patent [19]

Walker

[11] 4,404,707
[45] Sep. 20, 1983

[54] CASTORS

[75] Inventor: Philip S. Walker, Slough, England

[73] Assignee: Flexello Casters & Wheels Limited, Berkshire, England

[21] Appl. No.: 266,589

[22] Filed: May 20, 1981

[30] Foreign Application Priority Data

May 6, 1980 [GB] United Kingdom ............... 8014993

[51] Int. Cl.³ .......................................... B60B 33/00
[52] U.S. Cl. ...................................... 16/31 R; 16/46
[58] Field of Search .................... 16/21, 26, 31 R, 36,
16/18, 19, 20, 29, 30, 45, 46, 47, 48; 301/5.3,
5.7, 63 PW; 46/25 R, 221, 222, 223

[56] References Cited

U.S. PATENT DOCUMENTS

| | | | |
|---|---|---|---|
| 3,869,105 | 3/1975 | Daniels | 16/18 R X |
| 4,043,603 | 8/1977 | Bergmann | 46/221 X |
| 4,097,954 | 7/1978 | Christensen | 16/21 |
| 4,122,580 | 10/1978 | Black | 16/46 |
| 4,153,308 | 5/1979 | Tanner | 301/63 PW |
| 4,170,384 | 10/1979 | Rotheiser | 46/221 X |
| 4,318,204 | 3/1982 | Black | 16/46 |

FOREIGN PATENT DOCUMENTS 2019867 4/1970 Fed. Rep. of Germany .
1150617 2/1967 United Kingdom .

Primary Examiner—Paul A. Bell
Assistant Examiner—John S. Brown
Attorney, Agent, or Firm—Stevens, Davis, Miller & Mosher

[57] ABSTRACT

A castor comprises separately formed plastics fork halves 53 and 54 with inwardly extending bosses 76 and 77 formed for detachable bayonet interconnection and providing a hub for the castor wheel 50. The upper parts of the fork halves define with the upper and lower ball races 58 and 67 and securing cap 55 inner end outer ball bearing tracks for the swivelling movement of the castor.

5 Claims, 8 Drawing Figures

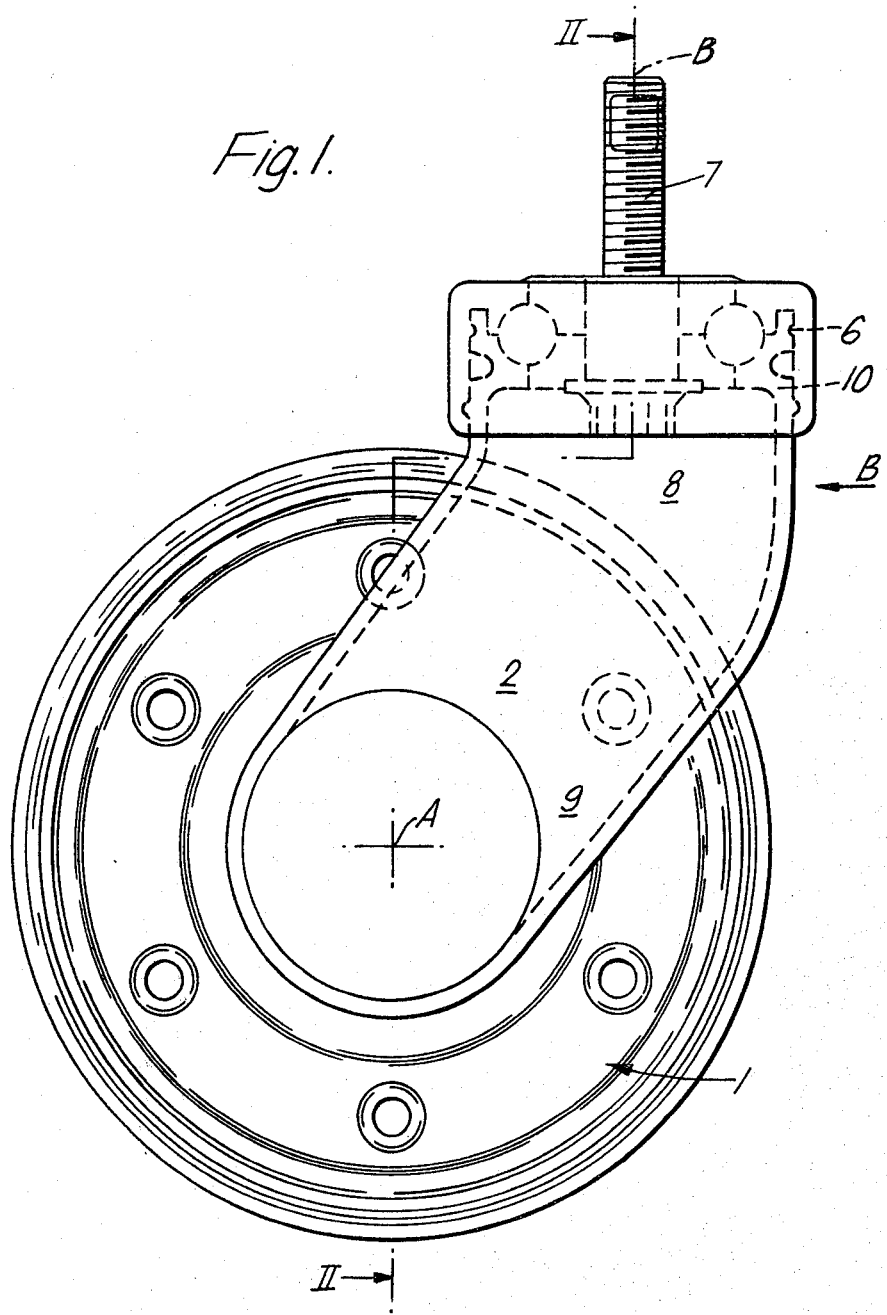

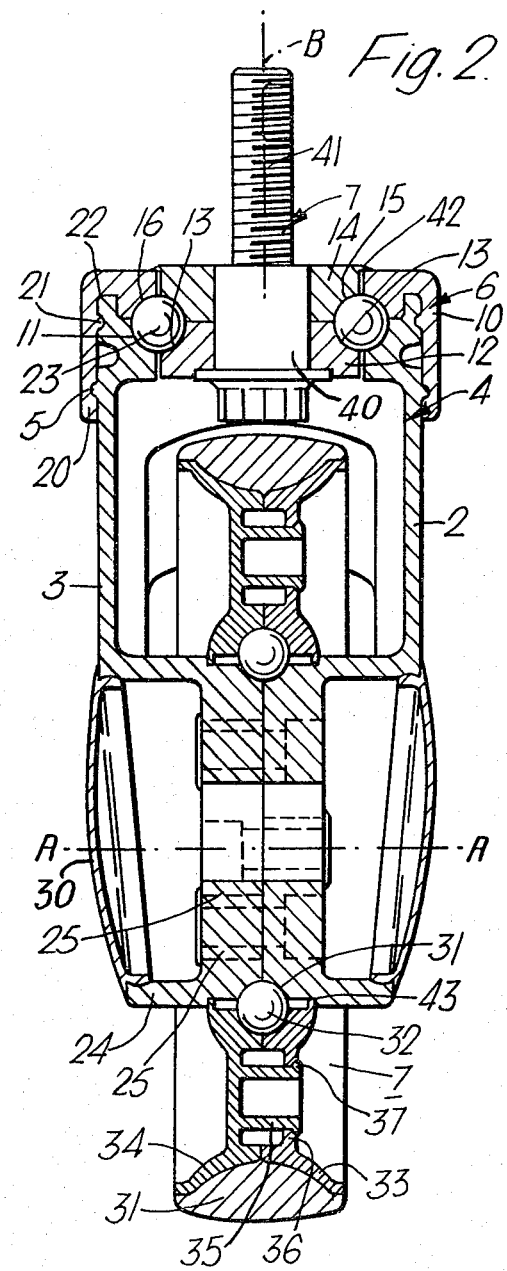

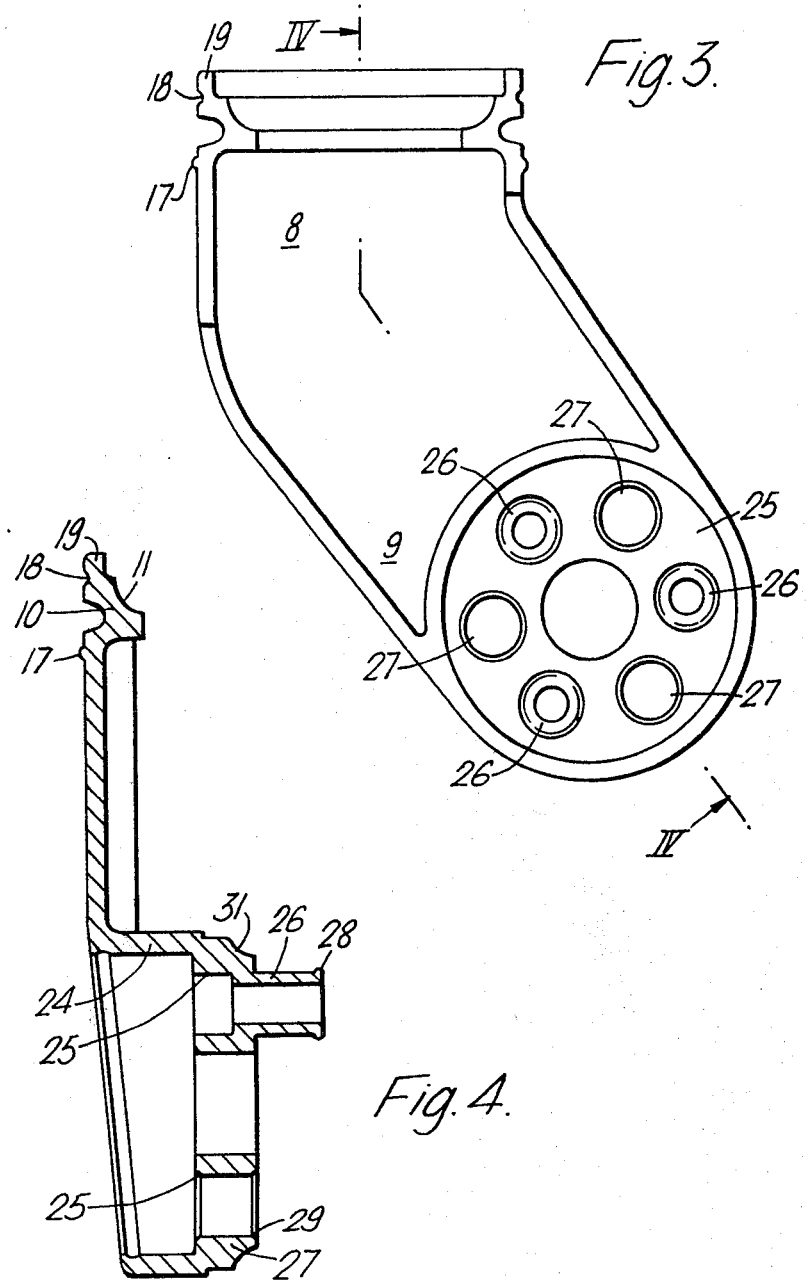

CASTORS

DESCRIPTION

This invention relates to a swivelling castor comprising a fork between the dependent legs of which a wheel or other roller is mounted about an axis which is horizontally disposed in use. The fork is mounted for castoring or swivelling movement about an axis vertically disposed in use and spaced from the horizontal rolling axis. This vertical axis is usually comprised by a stem or other element attachable to the article to be supported by the castor.

According to the present invention the fork is made as two discrete parts separable from one another each part comprising a leg and the parts together defining a track for bearings, either for the rolling or the castoring movement or preferably for both said movements.

Thus in an embodiment a wheeled castor comprises two similar fork halves formed for detachable interengagement and which together define:

(a) a sector, preferably the bottom outer 90° sector, of a circular horizontal track for bearing balls at the top cross part of the castor from which the fork legs depend. These bearings support the stem so that the swivelling about the vertical castoring axis can take place, and (b) a circular vertical track for bearing balls on a circumference around the rolling axis. An outer wheel part is mounted for the rolling movement on these balls.

The two halves can readily be moulded from a thermoplastic material and the tracks thereby being of plastic material offer considerable advantages for quiet running and shock absorbing. The plastic fork halves also provide shock absorption.

In one embodiment the two halves are provided with complementary mating parts whereby they can be pressed tightly, advantageously with a resilient snap action, into engagement with one another. In a second embodiment the two halves are formed for bayonet type interconnection.

Two particular embodiments of the invention will now be described by way of example and with reference to the accompanying drawings wherein:

FIG. 1 is a side view of a wheeled castor in accordance with a first embodiment of the invention;

FIG. 2 is a section on the line II—II of FIG. 1;

FIG. 3 is an inner view of one fork half;

FIG. 4 is a section on the line IV—IV of FIG. 3;

Figure 5:
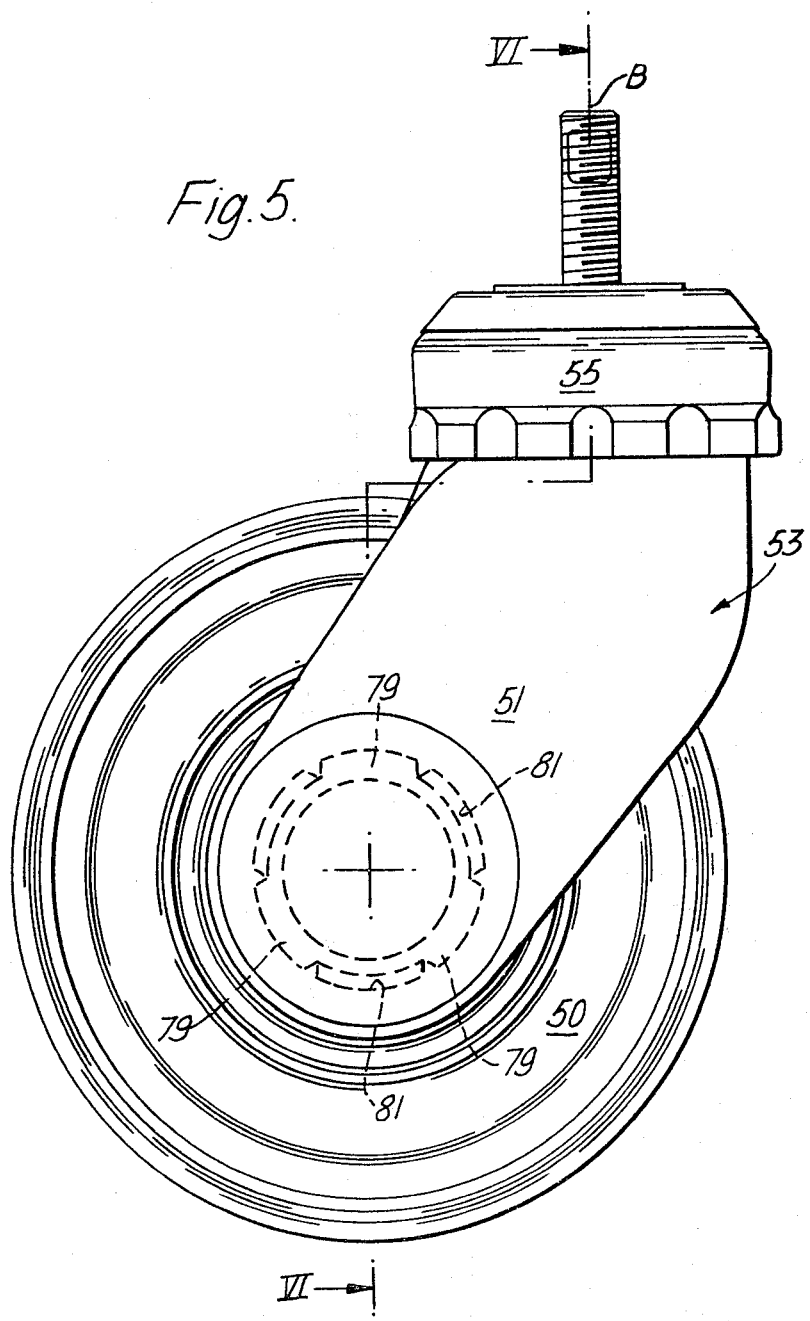
FIG. 5 is a side view of a castor in accordance with a second embodiment of the invention.

Referring initially to FIGS. 1 and 2 of the accompanying drawings the castor illustrated therein comprises a wheel 1 mounted for rolling movement about an axis A between the dependent legs 2 and 3 of castor halves 4 and 5. The top part of the castor comprises a snap-on cap 6 and a metal mounting stem 7 on castoring axis B in position within the cap. The stem and castor, as will be explained, are mounted for relative swivelling or castoring about axis B. The stem 7 has a lower part 40 which carries the inner bearing components and has an upwardly extending reduced threaded portion 41.

Each castor half comprises an upper vertically disposed part 8 and a rearwardly inclined part 9 supporting wheel 1. The upper part 8 has an inwardly extending rim 10, the top corner of which is chamfered away to define the bottom outer sector 11 of a track for bearing balls. A lower ball race 12 located on stem part 40 has a complementary bottom inner sector 13. An upper ball race 14 also located on stem part 40 also has a complementary top inner sector 15 and the bearing assembly is completed by a snap-on cap 6 also with a top outer sector 16. The upper surface of ball race 14, when assembled, is positioned flush with the shoulder defined by the upper annular surface of stem part 40 and sealing lips 42 extend to the upper surface of cap 6. Thus the track for bearing balls 23 is defined by inner sectors 13 and 15 of ball races 12 and 14 respectively and outer sectors 11 and 16 of the castor halves and the cap respectively. More usually in a castor the balls run between upper and lower tracks.

As can best be seen with reference to FIGS. 3 and 4 each leg upper part 8 has a shallow annular projection or pip 17 and above pip 17 a shallow recess 18. Above recess 18 part 8 extends upwardly as an undercut lip 19. Pip 17, recess 18 and lip 19 all constitute mating parts with a complementary annular recess 20, annular pip 21 and annular channel 22 are formed on cap 6. The castor halves 4 and 5 and cap 6 are formed in a relatively hard resiliently flexible plastics so that the cap snaps tightly and securely over the castor halves to complete the castor. The plastics material, and that from which ball races 12 and 14 are formed, is moreover chosen for its suitability to provide a track for bearing balls 23. Suitable materials include a polyacetal copolymer and the polyamide resins.

When the castor is attached by tightening stem 7 the shoulder 40 is forced into metal to metal contact and provides the required amount of loading on the bearing by downward force on upper plastic ball race 14. Overtightening with damage to the plastic is prevented by the abutment referred to above. In order to prevent the ball races becoming dislodged prior to installation with the securing nut interconnecting pins and sockets are provided.

The lower part 9 of each leg 2, 3 is formed inwardly into a countersink or boss 24 having an annular flange 25. Flanges 25 on legs 2, 3 have complementary mating parts and together with wheel proper provide a track for wheel bearings.

As can well be seen in FIGS. 3 and 4 each flange 25 has, in the embodiment illustrated, an array of six complementary mating members three male 26 and three female 27, the members in one leg being offset with relation to those in the other so to achieve mating. The specific form of these mating members can well be seen in FIG. 4. Each male mating member 26 comprises a cylindrical spigot with an enlarged outer end 28. Each female mating member 27 is a cylindrical socket to receive the spigot, the ends of the socket being chamfered at 29 to allow entry and locking exit of male member 28. A snap engaged plug 30 covers each countersink 24.

The meeting outer corners of each flange 25 are recessed at 31 to define the inner part of a track for wheel bearing balls 32. The wheel 1 is made of two axially separable halves 33 and 34 joined by the resilient interengagement of male members 35 and female members 36, the male members again having end enlargements 37 to achieve interlock. The wheel halves are recessed at 38 to define the upper part of a track for balls 32. The wheel halves adjacent recesses 38 have sealing lips 43 which abut flanges 25 carried by legs 2 and 3. A tire 39 of elastomeric material is trapped between wheel halves 33 and 34. This is an advantageous feature allowing ready installation of the tire.

The snap-in connections securing the castor halves together and hence the stem and wheel bearing with sealing lips 42 and 43 ensure that the bearings are sealed and hence permanent prelubrication is possible. The wheel construction which is believed to be novel in itself offers advantage in that the bearing has a large radius, i.e. the countersinks 24 and associated parts are a hub of substantial radius which allows a low point loading on the relatively large balls used. This low loading means minimal track wear.

Referring now to FIGS. 5–8 the second exemplary castor illustrated comprises a wheel 50 mounted for rolling movement about a horizontal axis between the dependent legs 51 and 52 of castor halves 53 and 54 again formed of a hard plastics material. The top part of the castor comprises a fitted plastics cap 55 and a metal mounting stem the stem and the castor being swivalable about a castoring axis B.

The upper vertically disposed part of each castor half 53, 54 has an inwardly extending rim 56 the upper inner corner of which is chamfered to define the bottom outer sector 57 of a track for bearing balls 57. A lower plastics ball race member 58 surrounds and houses a short vertically extending metal bush 59 surrounding stem 71. The upper outer edge of race member 58 is chamfered to define the bottom inner sector 60 of the ball bearing track. A sealing lip 61 on member 58 extends downwardly and outwardly to abut the inside of the castor legs. A locating recess 62 is formed in the upper surface of the lower ball race member 58 around the bush 59.

A plurality, four in the embodiment now being described, of radially outwardly extending projections 63 are provided at the upper part of the castor half to serve for bayonet-type engagement with the cap 55. The cap 55 has a part-circular inwardly and downwardly directed sectorial recess 64 forming the upper sector of the outer part on the ball bearing track. As can be best seen by consideration of FIGS. 6 and 7, the cap 55 has inwardly extending projections 65 for engaging under the projection 63 on the castor halves 53 and 54, the arrangement being that the leg and cap have a bayonet-type connection wherein at a first relative angular position of the cap and registering castor halves the projections 63 and 65 are not coincident and can be engaged with one another in the desired abutting orientation of the associated parts. When the cap is swivelled about the castoring axis the projections 65 thereon engage under the projections 63 to secure the cap and castor halves in the position illustrated. It will be noted that on the split line between the castor halves a single projection 65 on the gap engages under and bridges two projections 63a and 63b on the castor halves. Stops 66 are provided on the cap to locate the projections in register. The stops are illustrated on an enlarged scale in FIG. 8 which is a plan section through a castor half 53 immediately above a projection 63. One of the stops 66, the entry stop, has an inclined ramp 66a to allow projection 65 to ride over it into the engaged position between the stops. In an alternative embodiment only two sets of projections are provided each bridging a slit between castor halves and extending over just under 90°.

The ball race is completed by an upper plastics race member 67 fitting over the cap 55 and located for assembly purposes by an annular rib 68 engaging recess 64 on lower washer 58. The race member 67 has a downwardly and outwardly facing part-circular sectorial recess 69 providing the upper part on the inner bearing track. Bearing balls 70 are located in the track defined by inner sectors 60 and 69 and outer sectors 57 and 64. It should be noted again that the bearing track is defined between inner and outer pairs of sectors as opposed to upper and lower parts.

The threaded stem 71 has a hexagonal head 72 and extends upwardly through the bush 59. A top flat metal washer 73 seats in an upper recess 74 in plastics washer 67. A sealing lip 75 on plastics upper ball race member 67 together with lip 61 on lower ball race member 58 prevents ingress of dirt to the bearing.

The lower part of each castor leg 51, 52 is provided with an inwardly extending cylindrical boss, a male boss 76 and a female boss 77. The male boss has an inwardly extending concentric spigot 78 of a bayonet connection having three radially outwardly extending generally rectangular projections 79. The female boss 77 with a socket 80 to receive spigot 78 has three recesses 81 corresponding to projections 79 so that when the projections and recesses 81 register the two bosses 76 and 77 can be pressed together to the desired relationship. In this orientation the upper parts of the castor are not in register. When the castor halves and hence the bosses are twisted to bring the projections 79 of the male boss 76 behind the normal rim of the female boss, i.e. when the bayonet connection is made, the upper parts of the castor come into register.

Figure 6:
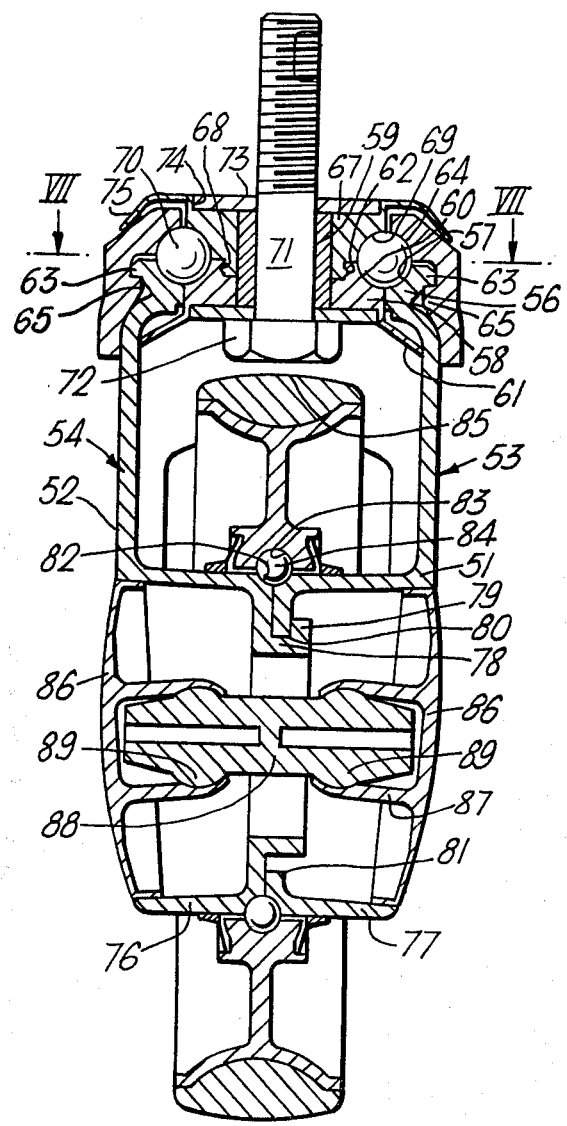
FIG. 6 is a section on the line VI—VI of FIG. 5.
Figure 7:
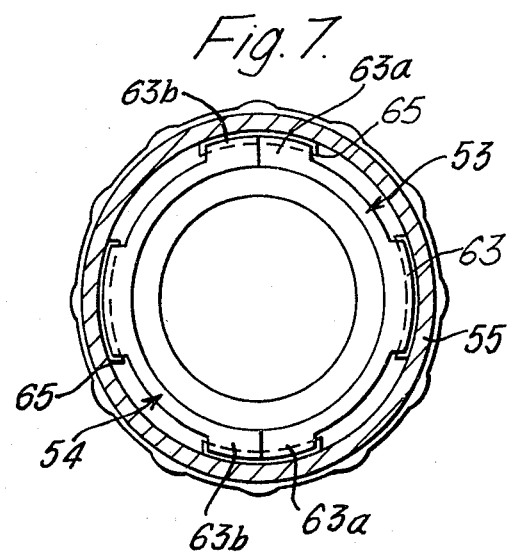
FIG. 7 is a section on the line VII—VII of FIG. 6.
Figure 8:
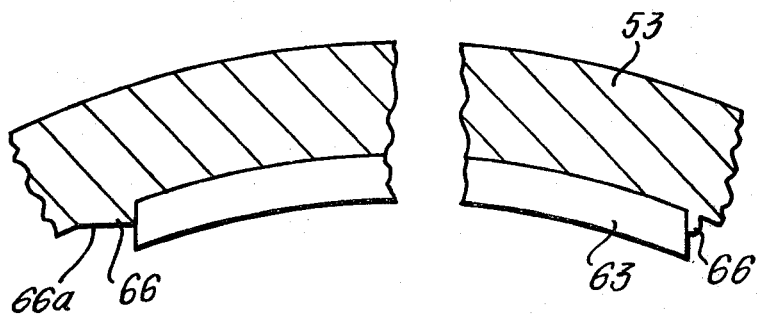
FIG. 8 is an enlarged detail of FIG. 7.

In this registering position the outer circumferential surfaces of the bosses together define a part-circular bearing track 82. The wheel 50 has a corresponding track 83 with interposed bearing balls 84 and a tire 85 is an interference fit onto the wheel. This wheel construction with the large radius bearing (the bosses 76 and 77 being the large diameter hub) offers the same running advantages as pointed out in the first embodiment described with reference to FIGS. 1 to 4. The outer part of the wheel of FIGS. 5 to 7 is of unitary construction however.

The cylindrical bore through the bosses is closed by end caps 80 having inwardly directed sockets 87. A dog bone shaped member 88 with enlarged heads 89 is a snap connection with the sockets to hold the caps 86 in position.

I claim:

1. A swivelling wheeled castor, comprising two similar fork halves, each of said fork halves comprising a leg, said fork halves having means for detachable interengagement with one another, and together defining:
   (a) part of a circular horizontal track for bearing balls at the upper part of the castor from which the fork legs depend, these bearings supporting a stem for relative swivelling movement about a vertical castoring axis; and
   (b) part of a circular vertical track for bearing balls on a circumference around the rolling axis, an outer wheel part being mounted for the rolling movement on these bearings.

2. A castor as claimed in claim 1 wherein the horizontal track is completed by recesses on lower and upper ball races and on a cap which holds the upper parts of the castor halves together.

3. A castor as claimed in claim 1 wherein the vertical track for bearing balls is defined between a hub of substantial diameter defined by detachably interengageable inwardly projecting bosses on the castor halves and an outer annular wheel member.

4. A castor as claimed in claim 1 wherein the means for detachable interengagement comprises complementary mating parts with resilient snap interengagement.

5. A castor as claimed in claim 1 wherein the means for detachable interengagement comprises bayonet-type connections.

* * * * *